(12) United States Patent
Schmidt et al.

(10) Patent No.: US 11,377,054 B2
(45) Date of Patent: Jul. 5, 2022

(54) CONTROLLING UNIT

(71) Applicant: VETUS B.V., Schiedam (NL)

(72) Inventors: Frederik Ferdinand Schmidt, Schiedam (NL); Arthur Johannes Maria Wilhelmus Roeling, Schiedam (NL)

(73) Assignee: VETUS B.V., Schiedam (NL)

( * ) Notice: Subject to any disclaimer, the term of this patent is extended or adjusted under 35 U.S.C. 154(b) by 0 days.

(21) Appl. No.: 17/292,826

(22) PCT Filed: Nov. 6, 2019

(86) PCT No.: PCT/NL2019/050726
§ 371 (c)(1),
(2) Date: May 11, 2021

(87) PCT Pub. No.: WO2020/096453
PCT Pub. Date: May 14, 2020

(65) Prior Publication Data
US 2021/0394694 A1    Dec. 23, 2021

(30) Foreign Application Priority Data

Nov. 11, 2018   (NL) .................................... 2021974

(51) Int. Cl.
*B60R 16/033*   (2006.01)
*H02J 4/00*   (2006.01)
(52) U.S. Cl.
CPC .............. *B60R 16/033* (2013.01); *H02J 4/00* (2013.01)

(58) Field of Classification Search
CPC ................................. H02J 4/00; B60R 16/033
(Continued)

(56) References Cited

U.S. PATENT DOCUMENTS

| 2002/0051368 A1 | 5/2002 | Ulinski et al. |
| 2006/0256592 A1 | 11/2006 | Yoshida et al. |

(Continued)

FOREIGN PATENT DOCUMENTS

| EP | 1473823 A2 | 11/2004 |
| EP | 3235670 A1 | 10/2017 |

(Continued)

*Primary Examiner* — Michael R. Fin
(74) *Attorney, Agent, or Firm* — Browdy and Neimark, PLLC

(57) ABSTRACT

Described is an electrical power controlling unit (1) for controlling electrical power delivery received from a direct current power source (2) to an electrical power consuming device (3), the alternating current power consuming device being driven by modulatable multiple phase alternating output current at a first voltage provided by the controlling unit, the controlling unit comprising an electrical current transformer (4), multiple outlet conductors (5) for connecting the transformer to the electrical power consuming device, command input means (6) to receive controlling commands from a controller interface (7), battery power input means (8), direct current power source input means (10) for receiving direct current from the electrical power source, a voltage converter (11), first conducting means (12) connecting the voltage converter to the current transformer, and second conducting means (13) connecting the voltage converter to a converted direct current power outlet (14).

16 Claims, 3 Drawing Sheets

Figure 2A:
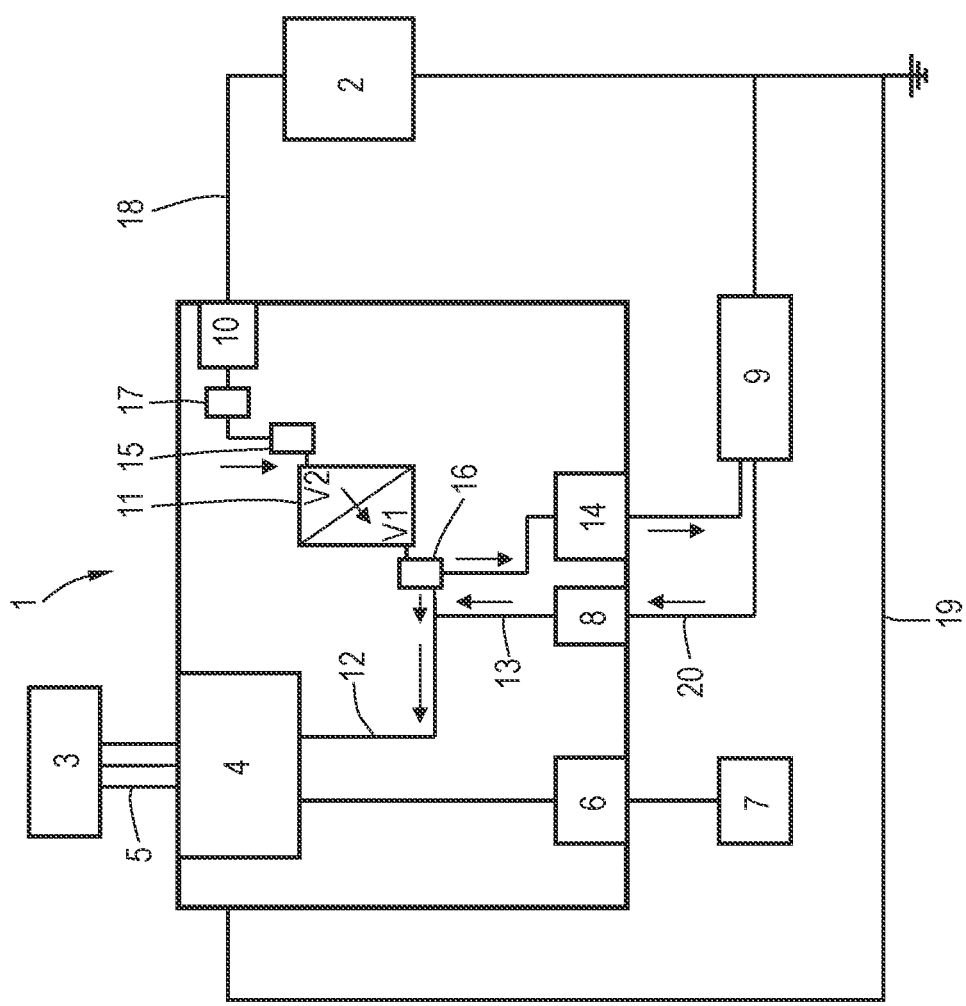

(58) Field of Classification Search
USPC ................................................ 307/10.1, 9.1
See application file for complete search history.

(56) References Cited

U.S. PATENT DOCUMENTS

| | | |
|---|---|---|
| 2013/0285459 A1 | 10/2013 | Jaoui et al. |
| 2016/0090081 A1* | 3/2016 | Akita .................... B60W 10/08 |
| | | 180/65.265 |
| 2018/0334046 A1* | 11/2018 | Lee ......................... H02M 1/44 |

FOREIGN PATENT DOCUMENTS

| | | |
|---|---|---|
| JP | 2012029538 A | 2/2012 |
| KR | 20010027874 A | 4/2001 |
| WO | 2018067839 A1 | 4/2018 |

* cited by examiner

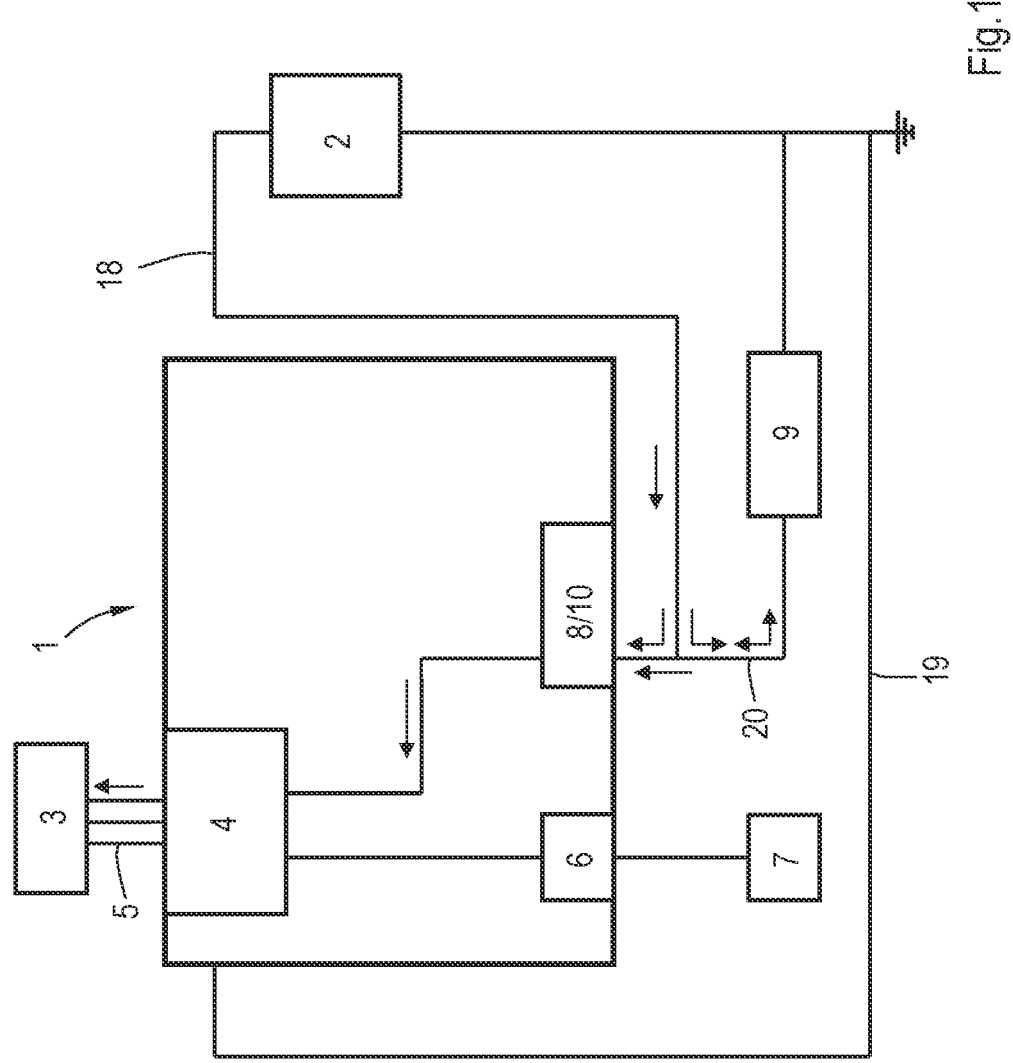

CONTROLLING UNIT

The invention relates to a novel controlling unit for controlling electrical power delivery received from a direct current (DC) power source to an alternating current power consuming device, the alternating current (AC) power consuming device being driven by modulatable multiple phase alternating output current at a first voltage provided by the controlling unit.

Such controlling units are known in the art and are used to generate modulatable alternating current power from a direct current power source, and to control the delivery of the power to the consuming device in a modulatable way. The term 'alternating current power' herein refers to electrical power, generated by alternating current (AC). The term 'direct current power' herein refers to electrical power, generated by direct current (DC).

In particular in mobile motor driven devices such as vessels and vehicles, direct electric power is generated by a direct current power generator, a dynamo, which power can be used to drive electrical devices or to be stored in battery assemblies. The term 'battery assembly' herein means any kind of battery, alone or connected to one or more additional batteries in parallel, in series or in a combination thereof. For example, a 24V battery assembly can be comprised of a 12V battery, connected in series with another 12V battery.

A controlling unit of the above kind known in the art and is manufactured and marketed by Vetus B. V., Schiedam, the Netherlands as MCV Motor controller, intended to be mounted on, or incorporated in 12V or 24V AC induction thruster motor as AC power consuming device, and are to be connected to a direct current power source.

To this end, such a controlling unit comprises:
a. an electrical current transformer, capable of transforming direct current of the first voltage to modulated multiple phase alternating output current,
b. multiple outlet conductors for connecting the transformer to the electrical power consuming device, the outlet conductors being designed to deliver modulated multiple phase alternating current from the transformer to the electrical power consuming device in a monodirectional way,
c. command input means to receive controlling commands from a controller interface, designed to modulate the electrical power to be delivered to the electrical power consuming device by the transformer,
d. battery power input means designed to receive direct electrical current from a battery assembly having the first voltage for conducting said direct current to the current transformer in a monodirectional way, and
e. direct current power source input means for receiving direct current from the direct current power source.

The controlling unit comprises an electrical transformer that transforms direct current into modulatable alternating current, and multiple outlet conductors by which the electrical transformer is contacted with the AC consuming device, e.g. an AC thruster motor such as a bow or stern thruster in order to provide AC current power to the AC consuming device in a monodirectional manner, meaning that the transformer is designed such that AC current is intended to flow from the transformer to the AC consuming device but not vice versa. The controlling unit comprises command input means that are designed to be connected to a controller interface, for receiving controlling demands and to modulate the electrical power to be delivered to the AC power consuming device. By modulation of the electrical power, a thruster motor can be controlled e.g. to produce variable propeller rotations. Such an interface can e.g. be designed as a joystick, allowing for proportional control of the thruster motor, for which the controller comprises the appropriate microprocessors and software.

The controller further comprises battery power input means, by which the controller can be connected to a battery or battery assembly to receive DC current power to be transformed by the transformer into DC current power for the thruster. A connection with a battery is of importance in case the DC power source cannot provide sufficient power necessary to drive the AC power consuming device. Such connection is monodirectional, i.e. the controller is designed to allow the electrical power to flow from the battery to the transformer, but not vice versa, as the AC power consuming device is not generating electrical current to be stored in the battery. In contrast, the AC power consuming device consumes electrical power, in in case of shortage in electrical power supply, the required electrical power can be provided by the battery.

The controller also comprises input means for connection of the controller with a DC power source in order to use the DC power provided by the DC power source to drive the DC power consuming device such as a thruster motor. Such DC power source input means are designed to receive current from the DC power source and are not designed to invert the current flow, i.e. from the controller to the DC power source. The input means therefore receive direct current from the DC power source in a monodirectional way. in a monodirectional way, The disadvantage of the controllers known in the art lies in the fact that the output voltage of the controller is equal to the input voltage. This voltage can be insufficient for the required power needed for the AC consuming device, such as a thruster, as concomitant high currents are undesired and even dangerous in a vehicle or boat. A thruster may require 25 to 285 kgf, i.e. requiring up to more than 800 Amp. The electrical installation would require massive cabling to allow such high currents to be safely conducted. The same is true for larger vessels that have a 24V DC power source. Thrusters are needed that require currents that are not desired from a safety and constructional point of view.

Other examples of AC consuming devices are winches, mounted on cars or boats, that need more power than the DC generator of the engine, usually driven by fossil fuel, can provide in a safe manner.

The above problems are obviated by an improved controller unit of the above art, that further comprises:
f. a voltage converter, the voltage converter being connected to the direct current power source input means, the said direct current power source input means being designed to receive said direct current power from the direct current power device at a second voltage in a monodirectional way, the second voltage being lower than the first voltage, the voltage converter being designed to convert the direct current power of the second voltage received by the direct current power source input means to converted direct current power having the first voltage,
g. first conducting means connecting the voltage converter to the current transformer in a monodirectional way, allowing the converted direct current power having the first voltage to be received by the current transformer,
h. second conducting means connecting the voltage converter to a converted direct current power outlet, designed to be connected with the battery assembly and to allow the converted direct current power to be received by the battery assembly in a monodirectional way.

By incorporation of a voltage converter, the voltage of the DC power source is increased, allowing the use of an AC power consuming device of higher voltage, enabling the provision of the required power at a lower current. Therewith improving safety and constructional ease. The voltage converter converts the voltage of the DC power source to converted DC power of higher voltage. The DC power is received from the DC power source via the DC current power source input means, that re designed to receive the DC power from the DC power source at the lower second voltage in a monodirectional way, meaning that the electrical current cannot flow from the voltage converter in the direction of the DC power source.

The controller further comprises first conducting means connecting the voltage converter to the current transformer in a monodirectional way, so as to provide higher voltage DC power to the converter, that transforms the higher voltage DC power to modulatable AC power of the said higher voltage. The controller is however designed such that electrical current cannot flow from the transformer to the voltage converter. The transformer is designed to receive DC power, to transform this DC power to AC power and to feed an AC consuming device with the said AC power in a modulatable fashion, is not designed to provide DC power from an AC power source. Therefore, the first conducting means are designed to transport the electrical power in a monodirectional way from the voltage converter to the transformer and not vice versa.

Second conducting means are present for connecting the voltage converter to a converted power outlet for converted DC power of the higher voltage, for connection with the battery or battery assembly, that is suitable for storing the electrical power at the higher voltage. These second conducting means are designed to allow electrical current to flow from the voltage converter via the said power outlet with a battery connected thereto but is not designed to conduct electrical power from the battery to the voltage converter. The electrical current flow in a monodirectional fashion from the voltage converter to the battery and not vice versa.

The controller device is preferably designed to modulate the electrical power to be delivered to the alternating current device (3) by varying the voltage and/or the frequency of the alternating output current by the transformer. The DC power consuming device preferably has a nominal voltage that equals the first voltage. The performance of the device can be modulated, e.g. by lowering the said voltage, or by changing the frequency of the alternating current, or by a combination of both. In preferred embodiment, the controller device is designed to modulate the electrical power to be delivered to the alternating current device by varying the voltage of the electrical power to a value between the first voltage and the second voltage.

In an attractive embodiment, the controlling unit comprises a voltage dependent input limiter, allowing direct electric current power received from the DC power source to enter the voltage converter above a predetermined voltage threshold of the said direct electric current power. In particular in vehicle and vessels, the electrical DC source provides for all electrical power that is consumed by the electrical devices in the vehicle or vessel. Such devices and batteries may have a priority over the power supply of the AC power consuming device connected to the controlling unit of the invention. In order to allow the DC power source to provide sufficient power for prioritized electrical consumers or storage, such as a battery for starting the engine, the voltage dependent input limiter can have a predetermined voltage threshold of e.g. the battery voltage of the starter engine when in rest. This would mean that the DC power generated by the DC power supply is first fed to the said battery, and only after reaching a voltage exceeding the said rest voltage, the controller receives electrical power for conversion and further use or storage in the battery of higher voltage.

In an attractive embodiment, the threshold is 105% of the second voltage or more, more preferably 106% of the second voltage or more. In case the DC power source generated electrical power at 12 V, a threshold of 105% would mean that as soon as a voltage of 12.6V is measured, the input limiter allows electrical power generated by the DC power generator to be received by the voltage converter to feed either the higher voltage battery connected to the voltage converter or the transformer in case direct power is need by the AC power consuming device. Correspondingly, a threshold of 106% would mean that a voltage of 12.8 V is needed. When the DC power source would generate DC power at a voltage of 24V, and the voltage converter would convert the power to 48V, a threshold of 105% would mean a voltage of 25.2V, and a threshold of 106% would mean a threshold of 25.6V.

In another attractive embodiment, the controlling unit comprises a voltage dependent output limiter, allowing converted direct current power to be received by the battery assembly below a predetermined voltage threshold of the battery assembly. When the battery assembly is full, no electrical power is to be conducted to the battery assembly, or only at a very low level (drop-wise charging). For this reason, the controlling unit comprises an output limiter that allows electrical power to be conducted from the voltage converter to the battery assembly only, when the battery assembly is not full, or to allow only a very low level sufficient for drop-wise charging. The threshold (or so-called 'cut off threshold') for the battery assembly can be determined dependent on the battery assembly and the envisaged voltage.

If the voltage converter converts an input DC power of 12V (the second voltage) to 24V (the first voltage), the battery assembly will have a voltage of 24V as well. If the 24 V battery assembly is full, the voltage thereof will be higher than 24V, e.g. 28-29V, such as 28.8V. In particular, the threshold is preferably 125% of the second voltage or less, preferably 120% of the second voltage or less. This would mean a threshold 30 V and 28.8V, respectively. In the latter case, the threshold is 28.8V, avoiding loading of the battery assembly that is already full. In that case, as the converted power is available to the transformer for feeding the AC power consuming device.

In a particular embodiment, the output limiter being designed to modulate the level of converted DC power to be received by the battery assembly such, that the level of converted DC power to be received by the battery is throttled above a predetermined throttle voltage threshold of the battery assembly. Below the throttle threshold, full charge of the battery assembly is permitted, however, between the throttle threshold and the cut-off threshold, the charging current is limited, preferably as a function of voltage of the battery assembly. The higher the voltage (i.e. the more the battery assembly is loaded) the less charging current is allowed to be received by the battery assembly. This is a common practise for battery charging. In an attractive embodiment, the throttle voltage threshold is 115% or of the first voltage or more.

If both the AC power consuming device and the battery assembly would require electrical energy, the controller can be designed such, that the demand by the power consuming device would prevail over that of the battery, resulting in a preferential feed of electrical power to the AC power consuming device. To this end, the output limiter could be designed such, that high voltage DC power is preferentially passed to the transformer, and in case of sufficient supply, the remaining power is passed to the battery assembly.

Attractively, the controller of the invention comprises a current input limiter limiting the DC power entering the controlling unit via the direct current power source input means to a predetermined value. Such a limiter avoids a too high current within the controlling unit and avoids unsafe situations. Preferably, the predetermined value is 80-120 Amp.

In an attractive embodiment, the first voltage is twice the second voltage. This means that if the DC power supply provides DC power with a voltage of 12V, the voltage converter converts the voltage to 24V, i.e. resulting in a twice as low current flow. A conversion from 24V to 48 is possible as well. 24V and 48V are preferred voltages for the first voltage.

Attractively, the electrical power source comprises an engine driven dynamo optionally combined with one or more batteries.

In a very attractive embodiment, the controlling unit is integrated in the electrical power consuming device. In case of a thruster, the controlling unit can be mounted on the thruster, or be incorporated within a common housing, to allow for compact and easy construction. The same is true for other devises, such as a winch.

In another attractive embodiment, the electrical power consuming device is an electrical driving engine in a motor driven vessel or vehicle, the electrical power consuming device preferably being a thruster of a vessel.

The invention will now be further exemplified in the following figures, wherein

FIG. 1 shows a controlling unit of the state of the art, and

Figure 2B:
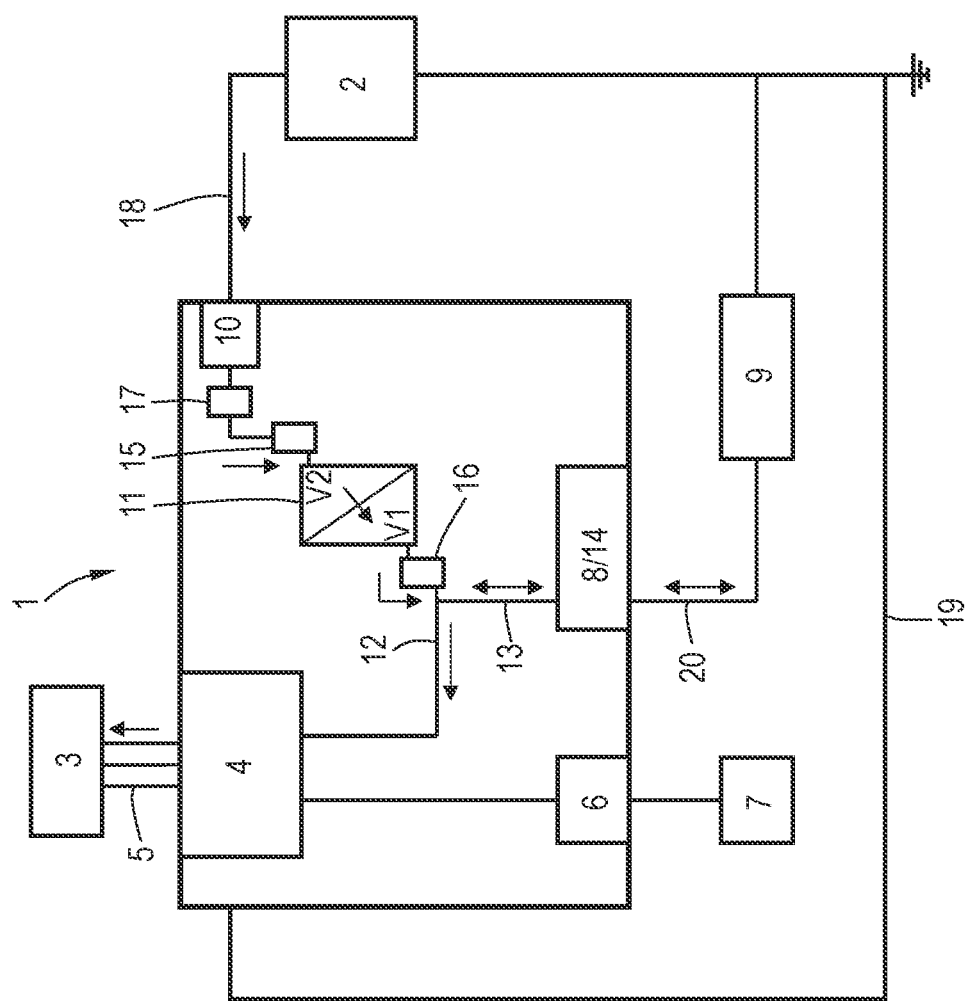

FIGS. 2A and 2B show embodiments of a controlling unit of the invention. The same or functional equivalent features in the figures are indicated with the same reference number. The current flow is indicated by arrows. A double headed arrow indicates that the respective feature is designed to allow the current to flow both ways; a single headed arrow (except for arrow 1 that does not indicate a current flow) indicates that the respective feature is designed to allow the current to flow in a monodirectional, i.e. a single way.

The controlling unit, indicated by 1, is connected by DC current input means 10 to a DC power source 2 via phase line 18 (positive). The earth line (negative) is indicated by 19. The controller 1 comprises a current transformer 4, capable of transforming DC current received via a battery input means 8 form either the DC power source via line 18 or from a battery assembly 9 via line 20.

The current transformer 4 is connected, via multiple outlet conductors 5 with an AC power consuming device 3 such as a thruster. The transformer provides multiple phase AC current to the consuming device 3. A triphasic situation is shown. The multiple outlet conductors 5 are designed to allow monodirectional current flow from the transformer 4 to the device 3. The controlling unit 1 comprises a command input means 6, connected with a controller interface 7 such as a joystick, designed to modulate the electrical power to be delivered from the transformer 4 to the consuming device 3. Said modulation is mediated by software and microprocessors within the controlling unit.

In the controlling unit of the art in FIG. 1, the voltage of the DC power source 2, the battery assembly 9 and the nominal voltage of the AC consuming device is the same, e.g. 12 V. Line 18 from the DC power source 2 is connected to line 20 from the battery assembly 9, and both lines 18, 20 are jointly connected to the controller via a combined battery power input means 8/DC power source input means 10. By this design, the DC power source 2 is also connected to the battery assembly 9 in a monodirectional way, enabling the battery assembly 9 to be charged by the DC power source. It is however also possible that DC power source 2 and battery assembly 9 are connected to the controlling unit via separate lines. The DC current flow into the controller is in both cases monodirectional. The current flow from the battery assembly 9 is monodirectional to the controller 1, i.e. no current is allowed to flow from the battery pack to the DC power source 2. The current flow from the DC source 2 to the battery assembly is monodirectional. The DC current is received from the DC power source 2 and/or battery assembly 9 in a monodirectional way by the transformer 4 where it is transformed to AC current of the same voltage and fed in a monodirectional way to the AC power consuming device.

In the controlling unit 1 of the invention (FIGS. 2 and 2A), lines 18 and 20 enter the controlling unit 1 separately, via DC power source input means 10 and battery power input means 8, respectively. The DC power furnished from the DC power source 2 is converted from the second voltage V2 of the DC power source to a higher voltage V1, e.g. from 12V to 24V in dc voltage converter 11. Voltage converter 11 is connected to the transformer 4 via first conducting means 12, and with the battery assembly 9 via second conducting means 13 and the converted DC power outlet 14. The conducting means 12 from the voltage converter 11 to the transformer 4 is monodirectional, i.e. allowing the electrical current to flow from the voltage converter 11 to the transformer 4, but not vice versa. The same is true for the connection between the DC power source 2 and the voltage converter 11, allowing only an electrical current flow from the DC power source 2 to the voltage converter 11. In FIG. 2B, the battery power input means 8 and the converted DC power outlet are shown to be combined, so that line 20 can be used both to charge the battery assembly, and to provide the current transformer 4 with required power from the battery assembly. However, separate lines are possible as well, as shown in FIG. 2A. In both embodiments however, the electrical current flow from the voltage converter 11 to the battery 9 is monodirectional. The same is true for the connection between the battery 9 and the transformer 4. The electrical current flows from the battery 9 to the transformer 4, but not vice versa, The voltage of the battery assembly, the current transformer and the AC power consuming device is the higher voltage V1, e.g. 24 V, whereas the voltage of the DC power source 2 feeding the controller unit with electrical energy is of the low voltage V2, e.g. 12V. The battery pack is now charged by via the high voltage converter 11 instead of being charged by the low voltage power source 2, therewith providing for a much stronger electrical storage device at a higher voltage. Upstream of the voltage converter, a voltage dependent limiter 15 can be placed, allowing electrical power to enter the voltage converter only if the provided power is of above a threshold voltage. Below the said threshold, no power is consumed by the controlling unit, therewith allowing the electrical energy from the DC power source 2 to be consumed elsewhere, e.g. for vehicle lights, charging a starting battery etc. Downstream of the voltage converter, a voltage dependent output limiter can be located, capable of modulating the electrical energy to be received by the battery assembly. As explained above, and known in the field of battery charging, the said limiter can cut off the electrical energy feed from the voltage converter to the battery assembly when the battery assembly is fully charged, i.e. at a certain predetermined voltage. In such a situation, the limiter 16 can allow for droplet wise charging of the battery assembly. The charging energy can also be throttled by the limiter 16 in case the voltage of the battery assembly reflects a value of being near to full; in that case, the charging energy can be more than the droplet charging, but less than full charging power, that will be allowed by the limiter below a certain voltage of the battery assembly. Further, the output limiter 16 can also be designed to select for preferential feeding of the AC power consuming device 3 instead of charging the battery assembly 9, in case a direct demand for power for the AC power consuming device 3 is made, e.g. by operating the controller interface 7. In case no power is provided by the voltage converter 11, but still a power demand is made for the AC power consuming device 3, the power can be furnished by the battery assembly 9. The controller can further comprise a current input limiter 17, limiting the current input in the controlling device 1, e.g. for safety reasons. Similar to the controlling unit of FIG. 1, the controlling unit 1 comprises a command input means 6, connected with a controller interface 7 such as a joystick, designed to modulate the electrical power to be delivered to the consuming device 3.

The invention claimed is:

1. Controlling unit for controlling electrical power delivery received from a direct current power source, the direct current power being generated by a direct current power generator in a motor driven vessel or vehicle, to an alternating current power consuming device, the alternating current power consuming device being an electrical driving engine in the motor driven vessel or vehicle and driven by modulatable multiple phase alternating output current at a first voltage provided by the controlling unit, the controlling unit comprising:
   a. an electrical current transformer, capable of transforming direct input current of the first voltage to modulated multiple phase alternating output current,
   b. multiple outlet conductors for connecting the transformer to the alternating current power consuming device, the outlet conductors being designed to deliver modulated multiple phase alternating current from the transformer to the electrical power consuming device in a monodirectional way,
   c. command input means to receive controlling commands from a controller interface, designed to modulate the electrical power to be delivered to the alternating current power consuming device by the transformer,
   d. battery power input means designed to receive direct electrical current from a battery assembly having the first voltage for conducting said direct current to the current transformer in a monodirectional way,
   e. direct current power source input means for receiving direct current from the direct current power source in a monodirectional way, characterized in that the unit comprises:
   f. a voltage converter, the voltage converter being connected to the direct current power source input means, the said direct current power source input means being designed to receive said direct current power from the direct current power source at a second voltage in a monodirectional way, the second voltage being lower than the first voltage, the voltage converter being designed to convert the direct current power of the second voltage received by the direct current power source input means to converted direct current power having the first voltage,
   g. first conducting means connecting the voltage converter to the current transformer in a monodirectional way, allowing the converted direct current power having the first voltage to be received by the current transformer,
   h. second conducting means connecting the voltage converter to a converted direct current power outlet, designed to be connected with the battery assembly and to allow the converted direct current power to be received by the battery assembly in a monodirectional way.

2. Controlling unit of claim 1, wherein the controller device is designed to modulate the electrical power to be delivered to the alternating current device by varying the voltage and/or the frequency of the alternating output current by the transformer.

3. Controlling unit of claim 2 wherein the controller device is designed to modulate the electrical power to be delivered to the alternating current device by varying the voltage of the electrical power to a value between the first voltage and the second voltage.

4. Controlling unit of claim 1, comprising a voltage dependent input limiter, allowing direct electric current power received from the direct current power source to enter the voltage converter above a predetermined voltage threshold of the said direct electric current power.

5. Controlling unit of claim 4, wherein the threshold is 105% of the second voltage or more, preferably 106% of the second voltage or more.

6. Controlling unit of claim 1, comprising a voltage dependent output limiter, allowing converted direct current power to be received by the battery assembly below a predetermined voltage threshold of the battery assembly.

7. Controlling unit of claim 6, wherein the threshold is 125% of the second voltage or less, preferably 120% of the second voltage or less.

8. Controlling unit of claim 6, the output limiter being designed to modulate the level of converted direct current power to be received by the battery assembly such, that the level of converted direct current power to be received by the battery assembly is throttled above a predetermined throttle voltage threshold of the battery assembly.

9. Controlling unit of claim 8, wherein the throttle voltage threshold is 115% or of the first voltage or more.

10. Controlling unit of claim 1, comprising a current input limiter limiting the direct current power entering the unit via the direct current power source input means to a predetermined value.

11. Controlling unit of claim 10, wherein the predetermined value is 80-120 Amp.

12. Controlling unit of claim 1, wherein the first voltage is twice the second voltage.

13. Controlling unit of claim 1, wherein the first voltage is 24 or 48V.

14. Controlling unit of claim 1, wherein the direct current power source is an engine driven dynamo, optionally combined with one or more battery assemblies.

15. Controlling unit of claim 1, being integrated in the electrical power consuming device.

16. Controlling unit of claim 1, wherein the electrical power consuming device is a thruster of a vessel.

\* \* \* \* \*